United States Patent [19]

Kurokawa et al.

[11] Patent Number: 4,804,280

[45] Date of Patent: Feb. 14, 1989

[54] PRINTER INCLUDING APPARATUS FOR CONTROLLING UNDERSCORE POSITION RELATIVE TO CHARACTERS

[75] Inventors: Yuji Kurokawa, Nagoya; Masataka Yoshikawa, Gifu; Takao Kato, Toyota; Hiroyuki Kikukawa; Yukiyoshi Muto, both of Nagoya, all of Japan

[73] Assignee: Brother Kogyo Kabushiki Kaisha, Aichi, Japan

[21] Appl. No.: 45,088

[22] Filed: May 4, 1987

[30] Foreign Application Priority Data

May 12, 1986 [JP] Japan .................................. 61-108134

[51] Int. Cl.⁴ ............................................ B41J 29/26
[52] U.S. Cl. ...................................... 400/17; 400/121; 400/555; 400/568; 400/582; 400/611
[58] Field of Search .................. 400/16, 17, 21, 22, 400/555, 568, 902, 121, 124, 545, 65, 556-567, 582, 583, 583.1, 583.2, 583.3, 583.4, 611

[56] References Cited

U.S. PATENT DOCUMENTS 4,488,827 12/1984 Haganuma .......................... 400/17

FOREIGN PATENT DOCUMENTS 99688 8/1981 Japan .................................. 400/17
156783 9/1984 Japan .................................. 400/17
129266 7/1985 Japan .................................. 400/17

Primary Examiner—David A. Wiecking
Attorney, Agent, or Firm—Parkhurst, Oliff & Berridge

[57] ABSTRACT

A printer having a first memory for storing character data representative of lines of characters to be printed on a recording medium, a second memory for storing line-space data representative of a line spacing between the lines of characters, and a control device for activating a print head according to the character data stored in the first memory, and controlling the print head and a paper feed device according to the line-space data stored in the second memory, to underscore at least one of the characters of the printed lines. The position of the underscore is controlled such that a distance between the underscore and the underscored characters is varied depending upon the line spacing represented by the line-space data.

6 Claims, 4 Drawing Sheets

PRINTER INCLUDING APPARATUS FOR CONTROLLING UNDERSCORE POSITION RELATIVE TO CHARACTERS

BACKGROUND OF THE INVENTION

1. Field of the Invention

The present invention relates to a printing apparatus, and more specifically to a control for determining the position of underscores placed below printed characters.

2. Discussion of the Prior Art

In a known printer, a recording paper is advanced by a suitable distance by feed rollers activated by a paper feeding device, before a desired portion of a printed line of characters is underscored by a print head. In this case, the underscore is located below the corresponding characters by the distance of feed of the paper in the direction perpendicular to the printing direction. In an alternative arrangement, underscores are printed simultaneously with the characters to be underscored, by a dot-matrix print head having a mutliplicity of printing elements which are arranged in a row in mutually spaced-apart relation in a direction perpendicular to the printing direction. In this case, a specific one of the printing elements is used for underscoring the characters.

In either of the above-indicated types of printer, a distance D1 between an underscore 2 and underscored characters 1 is constant, irrespective of an interline spacing D2 between the adjacent lines of characters, as illustrated in FIG. 4, that is, irrespective of a selected line spacing.

In the above underscoring arrangement, no problem arises where the interline spacing D2 is sufficiently large. However, in the case where the underscore 2 is printed in a printing operation with the line spacing D2 set at a relatively small value, the ratio of the character-to-underscore distance D1 to the interline spacing D2 may be excessively large, causing the underscore 2 to appear as a line separating the adjacent lines of characters, rather than an underline underlying the upper line of characters.

SUMMARY OF THE INVENTION

It is accordingly an object of the present invention to provide a printer wherein the position of an underscore relative to the underscored characters can be varied, depending upon the currently selected interline spacing between adjacent lines of characters to be printed.

The above object can be achieved according to the present invention, which provides a printer for printing on a recording medium, comprising (a) printing means for printing lines of characters on the recording medium in a printing direction; drive means for effecting a relative movement between the recording medium and the printing means, in a direction perpendicular to the printing direction; first memory means for storing character data representative of the lines of characters to be printed on the recording medium; second memory means for storing line-space data representative of and interline spacing between the lines of characters to be printed; and control means connected to the printing means, the drive means, and the first and second memory means, for controlling the printing means to print the lines of characters according to the character data stored in the first memory means. The control means is adapted to control the printing means and the drive means according to the line-space data stored in the second memory means, to print an underscore below at least one of the characters such that a distance between the underscore and the at least one underscored character is varied depending upon the interline spacing represented by the line-space data.

In the printer of the present invention constructed as described, the desired lines of characters are printed by the printing means which is operated under the control of the control means according to the character data stored in the first memory means. Further, when the desired characters are underscored, the printing means and the drive means are controlled by the control means according to the line-space data stored in the second memory means, such that the distance between the underscore and the corresonding characters is adjusted depending upon the currently selected interline spacing indicated by the line-space data. Accordingly, the underscore can be placed at an adequate position below the corresponding characters, even when the line spacing between the adjacent lines of characters is comparatively small. That is, the underscore-to-character distance is reduced as needed, when the printing is effected with a relatively small line spacing.

According to one feature of the present invention, the drive means comprises checking means for determining whether the interline spacing represented by the line-space data stored in the second memory means is greater than a predetermined value, and designating means for selecting a first distance if the checking means determines that the interline spacing is greater than the predetermined value, and a second distance shorter than the first distance if the checking means determines that the interline spacing is not greater than the predetermined value. The first and second distances represent the distance between the underscore and the at least one underscored character. In this case, the second distance may be zero.

According to another feature of the invention, the control means controls the printing means and the drive means such that the distance between the underscore and the at least one underscored character is varied substantially in proportion to the interline spacing represented by the line-space data. It is also possible that the underscore-to-character distance may be changed in relation to the interline spacing, e.g., in proportion to the interline spacing, only when the interline spacing is smaller than a predetermined value.

In accordance with a further feature of the invention, the printing means includes a print head which has a multiplicity of printing elements arranged in a row in spaced-apart relation with each other in a direction intersecting the printing direction. The printing elements are selectively energized while the print head is moved in the printing direction. In this arrangement, one of the printing elements which is located at an extreme end of the row is energized to underscore the at least one character. For example, the printing element at the uppermost end of the row may be used to underscore the characters.

BRIEF DESCRIPTION OF THE DRAWINGS

The above and other objects, features and advantages of the present invention will become more apparent by reading the following detailed description of preferred embodiments of the invention, when considered in conjunction with the accompanying drawings, in which.

DETAILED DESCRIPTION OF THE PREFERRED EMBODIMENTS

Figure 1:
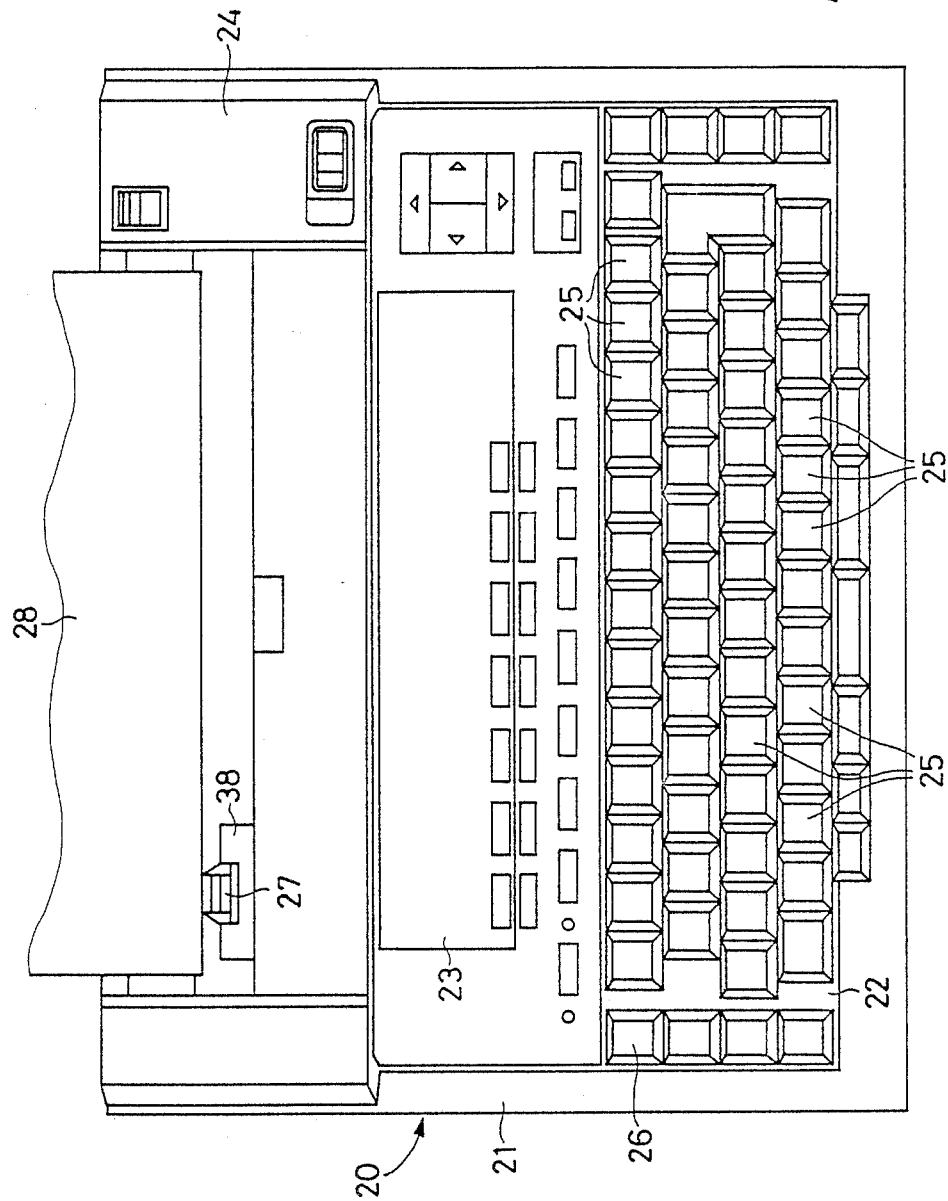
FIG. 1 is a plan view of a Japanese word processer incorporating one embodiment of a printer of the present invention.

Referring first to FIG. 1, a word processor adapted for the Japanese language is indicated generally at 20. The word processor 20 has a housing 21 which accommodates in its front part a keyboard 22 and a liquid crystal display 23. In the rear part of the housing 21, there is incorporated a printer 24 which is constructed according to the principle of the present invention. The keyboard 22 has a multiplicity of character keys 25 corresponding to characters such as letters and numerals, and function keys including a PRINT START key 26.

The printer 24 includes a print head 27 of a dot-matrix type adapted for printing in a dot-matrix fashion on a recording medium in the form of a paper 28. The print head 27 is reciprocated in a printing direction perpendicular to a paper feeding direction in which the paper 28 is advanced relative to the print head 27, by means of a feed roller (not shown). Thus, lines of characters entered through the character keys 25 may be printed on the paper 28 while the print head 27 and the paper 28 are moved in the printing and paper feeding directions, respectively.

Figure 2:
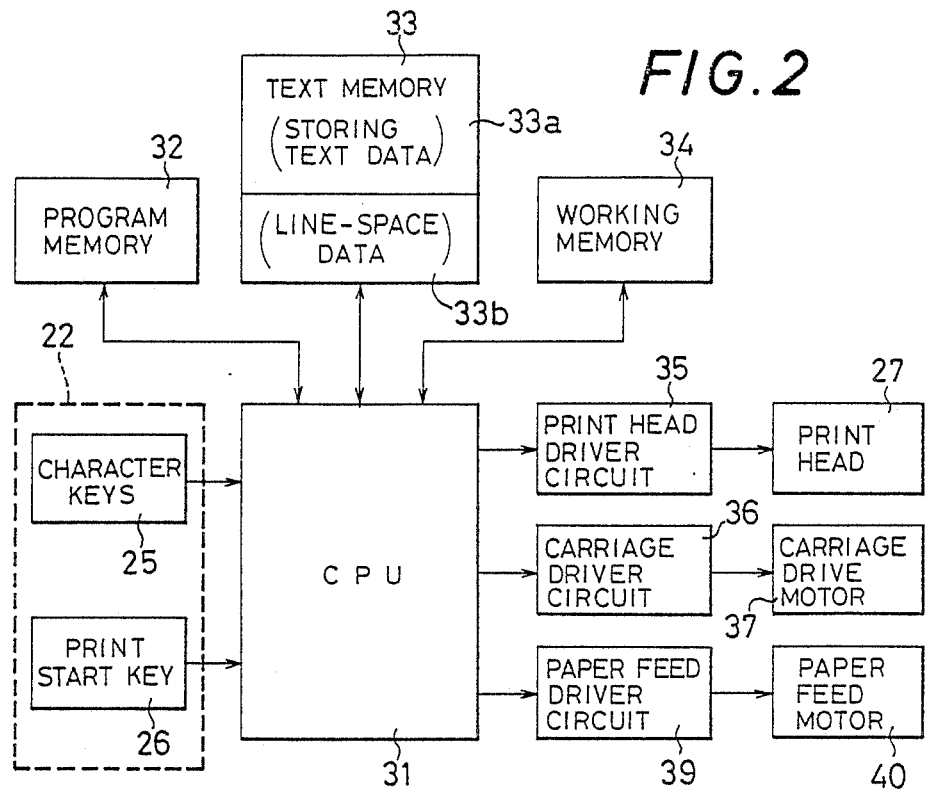
FIG. 2 is a schematic block diagram showing a control system of the printer.

Referring next to FIG. 2, there is shown an electric control system for controlling the printer 24 built in the Japanese word processor 20.

In the figure, reference numeral 31 designates a central processing unit (hereinafter referred to as "CPU") which serves as drive control means, as described later. The CPU 31 is operated according to control programs stored in a PROGRAM memory 32 constituted by a read-only memory (ROM). The CPU 31 is further connected to the keyboard 22, for receiving signals from the character keys 25, and a PRINT START signal from the PRINT START key 26. In response to the PRINT START signal, the CPU 31 initiates a printing control operation.

The word processor 20 further has a TEXT memory 33 constituted by a random-access memory (RAM). The TEXT memory 33 includes a first memory section (first memory means) 33a for storing character data representative of a text which usually consists of lines of characters entered through the keyboard 22 of the Japanese word processor 20. The TEXT memory 33 further includes a second memory section (second memory means) 33b for storing line-space data representative of a interline spacing D2 between the adjacent lines of characters to be printed according to the character data stored in the first memory section 33a.

In an automatic setting mode, the interline spacing D2 is automatically determined by the CPU 31 according to a specific control program stored in the PROGRAM memory 32, when the operator designates the desired number of lines to be printed per page, by using the character keys 25 on the keyboard 22. The determined interline spacing D2 is stored as line-space data in the second memory section 33b of the TEXT memory 33. In the present embodiment, the printer is also operable in a manual setting mode in which the interline spacing D2 is set to a desired value by the operator using the character keys 25. In this mode, too, the selected interline spacing D2 is stored in the second memory section 33b of the TEXT memory 33.

The word processor 20 further has a WORKING memory 34 constituted by a random-access memory (RAM), for temporarily storing various data such as results of arithmetic operation obtained by the CPU 31.

Figure 4:
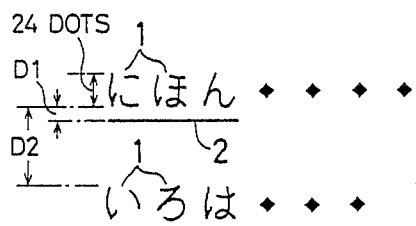
FIG. 4 is an illustration showing the position of an underscore where the interline spacing between adjacent print lines is relatively large.

The dot-matrix print head 27 has 24 printing elements which are arranged in a mutually spaced-apart relation in a row perpendicular to the printing direction. The 24 printing elements, which correspond to 24 dots printable on the paper 28, are selectively energized according to signals received from the CPU 31 via a print head driver circuit 35, to print characters 1 on the paper 28 with a matrix of dots, as illustrated in FIG. 4, while the print head 27 is moved in the printing direction. The print head 27 is mounted on a carriage 38 (FIG. 1) which is moved in the printing direction relative to the paper 28, by a carriage drive motor 37. This motor 37 is operated according to signals received from the CPU 31 via a carriage driver circuit 36.

The paper 28 is advanced in the direction perpendicular to the printing direction, by the feed roller (not shown) which is driven by a paper feed motor 40. This feed motor 40 is operated according to signals received from the CPU 31 via a paper feed driver circuit 39.

As described above, the print head 27, carriage 38, carriage drive motor 37, etc. constitute printing means for printing lines of characters 1 on the recording medium 28. Further, the paper feed motor 40 cooperates with other elements to constitute drive means for effecting a relative movement between the recording medium 28 and the print head 27 of the printing means.

Figure 3:
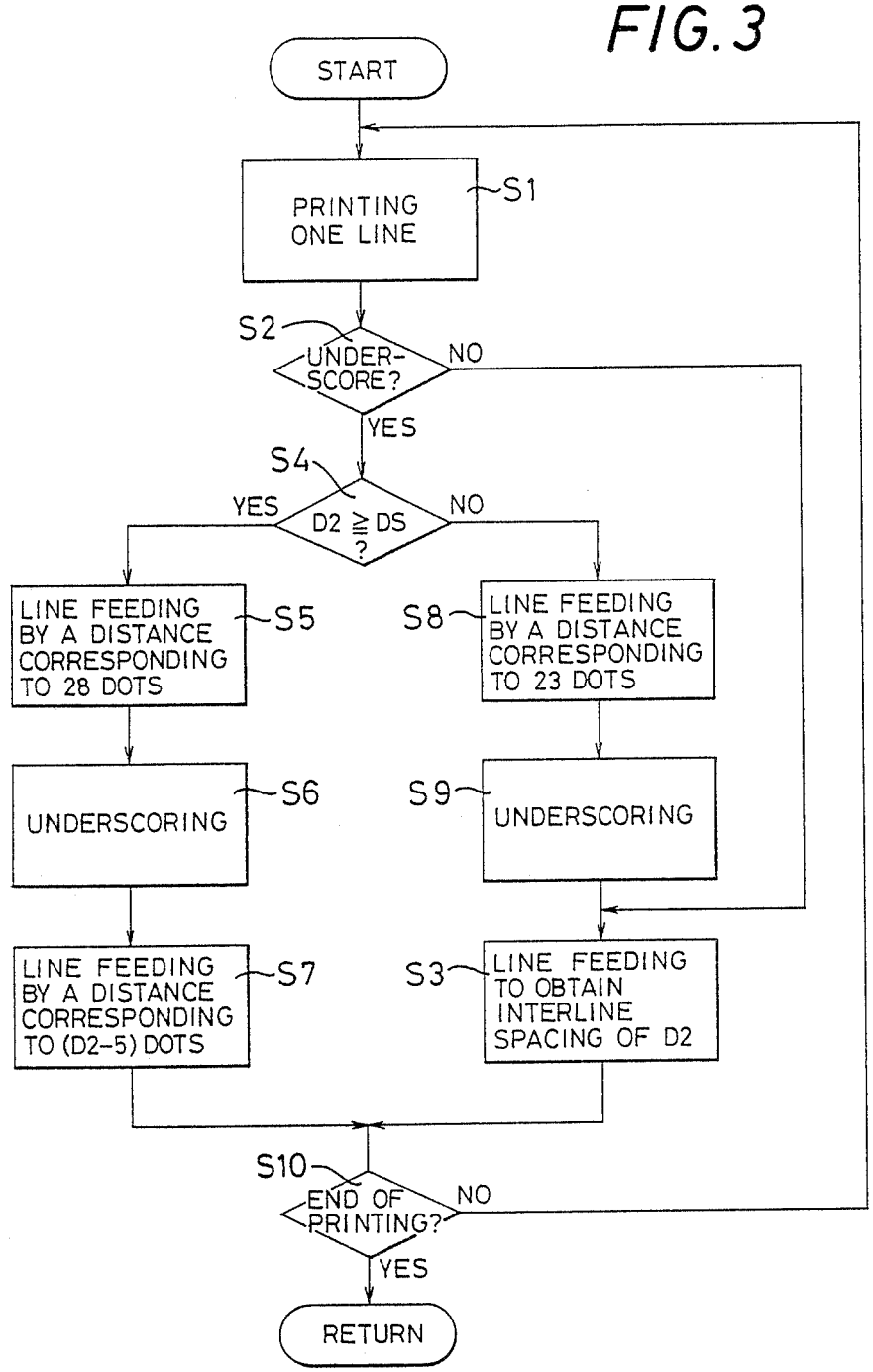
FIG. 3 is a flow chart illustrating a printing operation of the printer, particularly associated with an underscoring operation.

Reference is now made to the flow chart of FIG. 3, which illustrates a printing operation wherein lines of characters are printed on the paper 28, with or without underscores, according to printing data in the TEXT memory 33, namely, the character data stored in the first memory section 33a, and the line-space data stored in the second memory section 33b.

Upon generation of a PRINT START signal as a result of activation of the PRINT START key 26, the CPU 31 initiates a printing routine, by first retrieving from the first memory section 33a of the TEXT meory 33 a set of character data representative of a first line of characters of a stored text. The retrieved set of character data is transferred to the WORKING memory 34. The CPU 31 controls the print head driver circuit 35 and the carriage driver circuit 36, according to the character data stored in the WORKING memory 34, to activate the print head 27 and the carriage drive motor 37 for printing the line of characters 1 on the paper 28. This printing operation is indicated as step S1 in FIG. 3.

Figure 5:
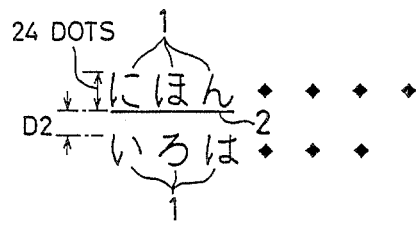
FIG. 5 is an illustration showing the position of an underscore where the interline spacing is relatively small.

After completion of printing of the line of characters in step S1, the CPU 31 goes to step S2 to check if the printed line of characters 1 includes any characters that are underscored as indicated at 2 in FIGS. 4 and 5. This checking is made by determining whether the character data for the printed line includes underscoring data associated with any printed characters.

If the decision in step S2 is negative (NO), that is, if the printed line does not include any character 1 that requires underscoring, the CPU 31 goes to step S3 in which the paper feed motor 40 is activated to advance the paper 28 to the position of the next print line, namely, to provide the selected interline spacing D2 between the printed line and the next line. For example, if the interline spacing D2 corresponds to 12 dot-to-dot intervals the paper 28 is advanced by a distance dots corresponding to 35 dot-to-dot intervals 23 dot-to-dot intervals defined by 24 dots corresponding to the 24 printing elements of the print head 27, plus 12 dot-to-dot intervals corresponding to the interline spacing D2). It will be understood that the number of intervals defined by dots is smaller by one than the number of the dots. For easy understanding, however, the "12 dot-to-dot intervals" or "23 dot-to-dot intervals", for example, will be hereinafter simply referred to as "12 dots" or "23 dots". Step S3 is followed by step S10 in which the CPU 31 checks if the set of character data stored in the WORKING memory 34 includes END OF PRINT data. If the decision in step S10 is affirmative (YES), the control returns to the main control routine of the word processor 20. If the decision in step S10 is negative (NO), that is, if the TEXT memory 33 has one or more sets of character data which have not been printed, the control returns to step S1 to retrieve from the first memory section 33a of the TEXT memory 33 the next set of character data for the next line of characters to be printed. Then, this line of characters is printed, in the same manner as described above.

If the decision in the step S2 is affirmative (YES), that is, the printed line includes any character that requires underscoring, the CPU 31 executes step S4 to determine whether the selected interline spacing D2 represented by the line-space data in the second memory section 33b is greater than or equal to a predetermined value DS. In this example, this value DS corresponds to 10 dots (10 dot-to-dot intervals as indicated above) Since the interline spacing D2 used in the present example corresponds to 12 dots as described above, the decision in step S4 is affirmative, whereby step S4 is followed by step S5 to activate the paper feed motor 40 so as to advance the paper 28 by a distance corresponding to 28 dots, namely, 23 dots corresponding to the size of the characters 1, plus 5 dots corresponding to a distance D1 between the underscore 2 and the characters 1 to be underscored. In the present embodiment, the uppermost one of the 24 printing elements of the print head 27 is used to print the underscore 2. Therefore, the underscore 2 is printed at a position which is spaced from the characters 1 by the distance D1 corresponding to 5 dots (28 dots minus 23 dots).

Thus, the underscore-to-character distance D1 is set to correspond to 5 dots if the interline spacing D2 is equal to or greater than the predetermined value DS corresponding to 10 dots. The data representative of the distance D1 used when the line spacing D2 is equal to or greater than the value DS, is stored in the PROGRAM memory 32, together with the data representative of the reference value DS.

After the paper 28 has been advanced to the determined position for printing the underscore 2, the CPU 31 goes to step S6 wherein the print head 27 and the carriage drive motor 37 are activated to print the underscore 2 under the appropriate characters 1, as indicated in FIG. 4.

The CPU 31 then goes to step S7 wherein the paper 28 is advanced by a distance corresponding to (D2-D1) dots, i.e., 12 dots minus 5 dots=7 dots, so that the print head 27 is positioned at the next print line. As previously indicated, the data representative of the interline spacing D2, and the data representative of the distance D1 are stored in the second memory section 33b of the TEXT memory 33 and the PROGRAM memory 32, respectively. Step S7 is followed by step S10 to check if the set of character data stored in the WORKING memory 34, that is, the character data for the last printed line includes END OF PRINT data. If the decision in step S10 is negative (NO), the control returns to step S1 to retrieve the set of character data for the next print line from the first memory 33a of the TEXT memory 33, and temporarily store the retrieved character data in the WORKING memory 34.

If the interline spaciang D2 is very small, for example, corresponds to 5 dots, namely, if the currently selected interline spacing D2 stored in the second memory 33b is smaller than the predetermined reference value DS (corresponding to 10 dots), step S4 is followed by step S8 wherein the paper 28 is advanced by a distance corresponding to 23 dots. As a result, the uppermost printing element of the print head 27 is positioned at the very bottom of the dot matrix of the characters 1 of the last printed line, so that the underscore 2 is printed at the lowermost dot position of the characters 1, as shown in FIG. 5.

In other words, when the interline spacing D2 is smaller than the predetermined distance DS (corresponding to 10 dots), the distance D1 between the underscore 2 and the characters 1 is zero. This distance D1 (=0) is also stored in the PROGRAM memory 32. After the paper 28 is fed by the distance corresponding to 23 dots, the CPU 31 executes the next step S9 to print the underscore 2 at the lowermost dot position of the desired characters 1 of the last printed line.

Then, the CPU 31 goes to step S3 to advance the paper 28 by a distance equal to the line spacing D2 (corresponding to 5 dots), so that the print head 27 is positioned at the next print line. Then, step S10 is executed to check if the set of character data for the line of characters printed last contains the END OF PRINT data. If the decision in step S10 is negative, the control returns to step S1, in order to print the next line of characters with or without the underscore 2, as described above.

In the present embodiment, the distance D1 between the characters 1 and the underscore 2 corresponds to 5 dots if the interline spacing D2 is equal to or greater than a distance corresponding to the predetermined reference value DS. If the interline spacing D2 is smaller than the reference value DS, the distance D1 is zero.

Therefore, the present embodiment eliminates the conventionally experienced drawback that the ratio of the underscore-to-character distance D1 to the interline spacing D2 is excessively large, if the interline spacing D2 is relatively small, since the distance D1 is constant irrespective of the interline spacing D2 in the conventional arrangement. In the present embodiment, the distance D1 is reduced if the interline spacing D2 is smaller than the predetermined permissible minimum DS.

Figure 6:
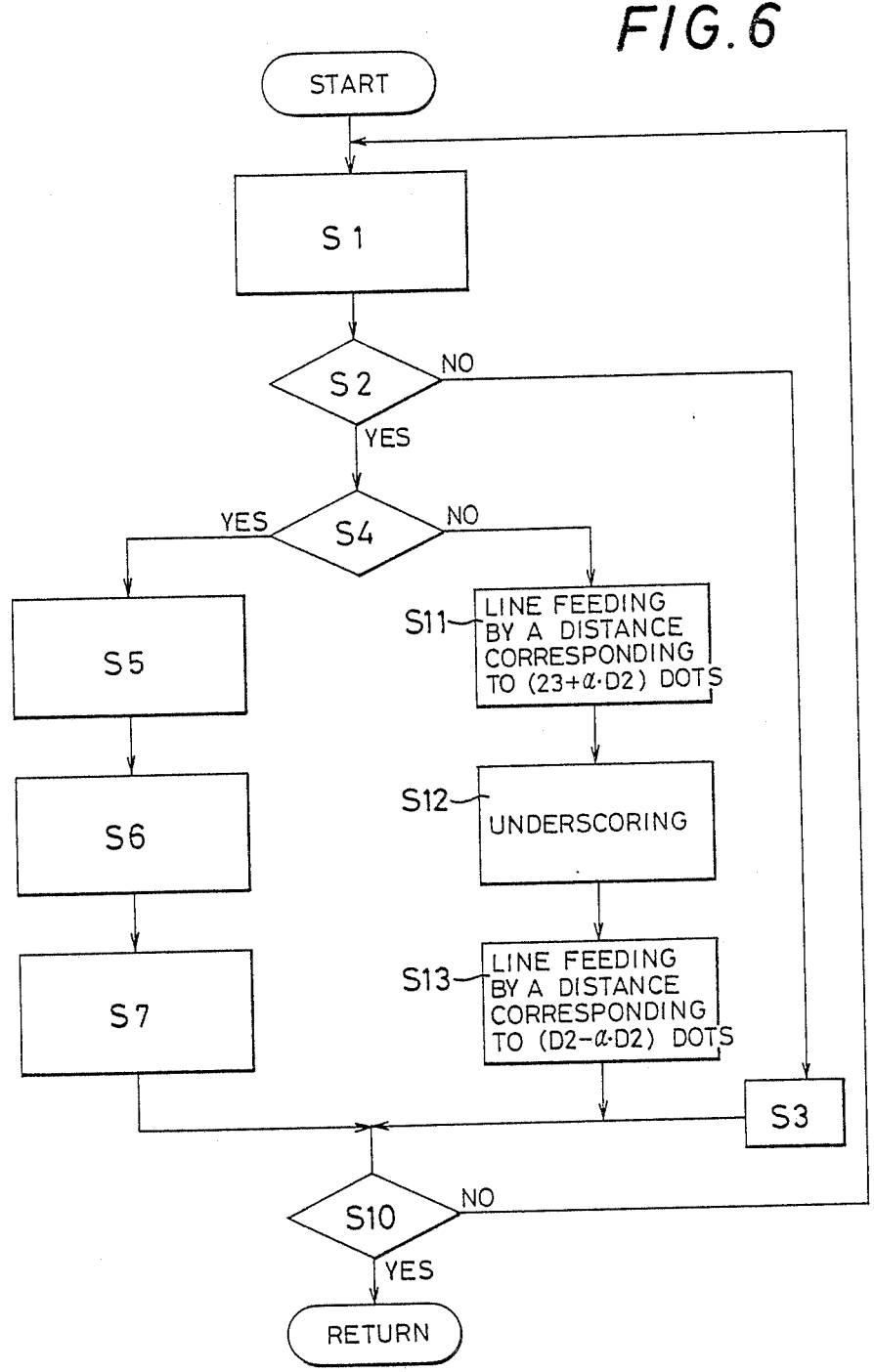
FIG. 6 is a flow chart corresponding to that of FIG. 3, depicting a modified embodiment of the present invention.

Referring to FIG. 6, a modified embodiment of the present invention will be described. This modified embodiment is different from the preceding embodiment, in that the underscore-to-character distance D1 is changed in proportion to the interline spacing D2, if the decision in step S4 is negative, i.e., if the line spacing D2 is smaller than the reference value DS. More specifically, step S4 is followed by step S11 wherein the paper 28 is advanced or fed by a distance corresponding to $(23+\alpha \cdot D2)$ dots, where $\alpha$ represents a constant, for example, $\frac{1}{4}$. In this case, the paper 28 is advanced by a distance corresponding to $(D2-\alpha \cdot D2)$ dots, in step S13 after the underscore 2 is printed in step S12 following step S11. In the other aspects, the present embodiment of FIG. 6 is similar to the preceding embodiment.

While the present invention has been described in its preferred embodiments, it is to be understood that the invention is not limited to the details of the illustrated embodiments, but may be embodied with various changes and modifications which may occur to those skilled in the art, in the light of the foregoing teachings.

For example, the reference value DS with which the currently selected line spacing D2 is compared, may be changed as needed, to a distance other than the 10-dot distance used in the illustrated embodiments. Further, the underscore-to-character distances D1 used in steps S5 and S8 (S11) may be selected as needed.

In the embodiment of FIG. 6, the distance D1 is determined in proportion to the interline spacing D2 only when the interline spacing D2 is smaller than the predetermined value DS, it is possible that this proportional determination of the distance D1 is accomplished also when the line spacing D2 is equal to or greater than the value DS. In this instance, different constants o may be used in steps S5 and S11.

While the printer 24 of the illustrated embodiment is a serial dot-matrix printer, the principle of the invention may be practiced for a line printer.

Although the present invention illustrated above is embodied as the printer 24 incorporated in the Japanese word processor 20, the invention may be embodied as a printing apparatus incorporated in other types of equipment, or a stand-alone printer as an output device connectable to a certain input device.

It is to be understood that other changes, modifications and improvements may be made in the invention, without departing from the spirit and scope of the invention defined in the following claims.

What is claimed is:

1. A printer for printing on a recording medium, comprising:
   printing means for printing lines of characters on the recording medium in a printing direction;
   drive means for effecting a relative movement between the recording medium and said printing means, in a direction perpendicular to said printing direction;
   first memory means for storing character data representative of said lines of characters to be printed on the recording medium;
   second memory means for storing line-space data representative of an interline spacing between said lines; and
   control means connected to said printing means, said drive means, and said first and second memory means, for controlling said printing means to print said lines of characters according to said character data stored in said first memory means, and controlling said printing means and said drive means according to said line-space data stored in said second memory means, to print an underscore below at least one of said characters such that a distance between said underscore and said at least one character is varied depending upon said interline spacing represented by said line-space data.

2. A printer according to claim 1, wherein said control means comprises:
   checking means for determining whether said interline spacing represented by said line-space data stored in said second memory means is greater than a predetermined value; and
   designating means for selecting a first distance if said checking means determines that said line spacing is greater than said predetermined value, and a second distance shorter than said first distance if said checking means determines that said interline spacing is smaller than said predetermined value, said first and second distances representing said distance between said underscore and said at least one character.

3. A printer according to claim 2, wherein said second distance is zero.

4. A printer according to claim 1, wherein said control means controls said printing means and said drive means, said control means varying said distance between said underscore and said at least one character substantially in proportion to said interline spacing represented by said line-space data.

5. A printer according to claim 1, wherein said printing means includes a print head which has a multiplicity of printing elements arranged in a row in spaced-apart relation with each other in a direction intersecting said printing direction, said printing elements being selectively energized while said print head is moved in said printing direction, one of said printing elements which is located at an extreme end of said row being energized to underscore said at least one character.

6. A printer according to claim 5, wherein said one of the printing elements is located at an uppermost end of said row.

* * * * *